W. C. Marquis,

Cage Trap.

N° 77,631. Patented May 5, 1868.

Witnesses

Inventor
W. C. Marquis
per
Alexander Mason
atty

United States Patent Office.

WILLIAM C. MARQUIS, OF BURGETTSTOWN, PENNSYLVANIA.

Letters Patent No. 77,631, dated May 5, 1868.

IMPROVED RAT-TRAP.

The Schedule referred to in these Letters Patent and making part of the same.

TO ALL WHOM IT MAY CONCERN:

Be it known that I, WILLIAM C. MARQUIS, of Burgettstown, in the county of Washington, and in the State of Pennsylvania, have invented certain new and useful Improvements in Rat-Traps; and do hereby declare that the following is a full, clear, and exact description thereof, reference being had to the accompanying drawings, and the letters of reference marked thereon.

In the annexed drawings, making a part of this specification—

Figure 1:
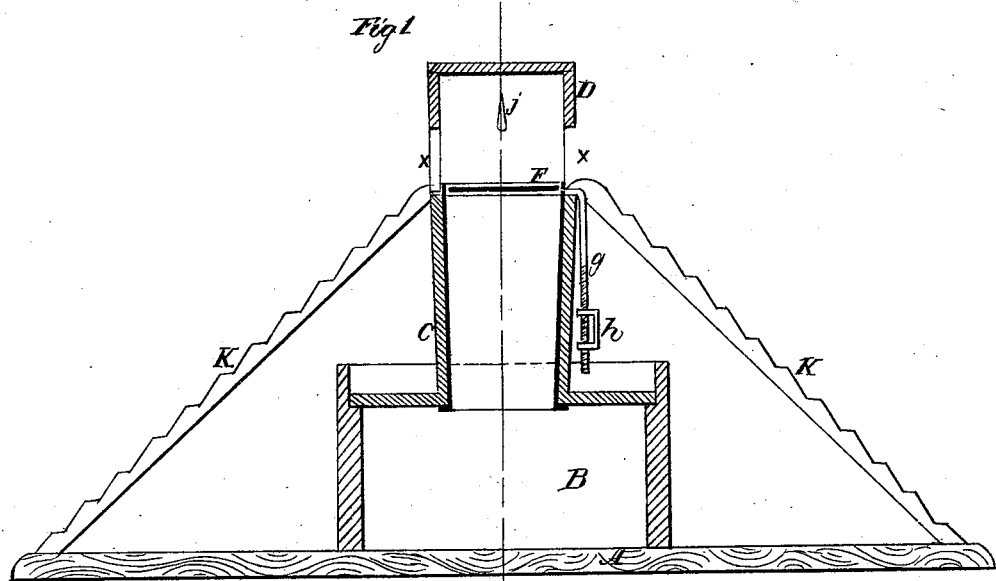
Figure 1 represents a longitudinal.
Figure 2:
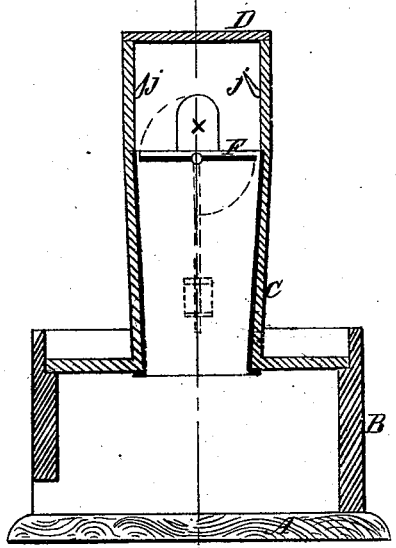
Figure 2 represents a cross-section of my improved animal-trap.

A, in the annexed drawings, represents a suitable base, upon which I secure a box or vessel, B, of any required dimensions, and made water-tight.

C represents a smaller box or spout, cased on the inside with metal, or made smooth therein, the bottom or base of which projects, and forms a flange, which just fits in and rests on a suitable shoulder inside of the vessel B, and thereby forms a lid therefor, as is fully shown.

On top of the spout C, I adjust a tilting-platform or valve, F. This valve F is made of a plate of such size and shape as will fit in the top of the spout C, and secured to the bent rod $g$, which rests in suitable bearings on the top of said spout. One end of the rod $g$ hangs down, as is shown, and has an adjustable weight, $h$, attached thereto, which may be moved up and down by means of the screw-threads in it and on said rod. This weight and hanging part of the rod $g$ are for the purpose of keeping the valve F in a horizontal position.

I place a cap or box, D, on top of the spout C, which has openings, $x\ x$, in its opposite sides, for the animal to pass into, and on to the tilting-platform or valve F.

In opposite sides of the cap, D, and over the tilting-edges of the valve, I secure hooks or feed-boxes $j\ j$, on or in which any kind of bait may be placed.

Leading from the base, A, up to the openings $x\ x$, and resting on the top of the spout C, are suitable strips or ways, K K, for the animal to go up to the trap on.

When the trap is arranged for use, I fill the vessel B full of water, or up as far as the lid thereof.

It is obvious that an animal will tilt the valve F, and thus be precipitated down the spout into the water, should it attempt to get at the bait at $j$.

Having thus fully described my invention, what I claim as new, and desire to secure by Letters Patent, is—

The tilting-platform F, when hung on a bent rod, $g$, in combination with the pendulous weight $h$ and spout C, the several parts being constructed and used as and for the purpose specified.

In testimony that I claim the foregoing, I have hereunto set my hand, this 1st day of February, 1868.

WM. C. MARQUIS.

Witnesses:
JOSEPH CRONER,
R. S. DONEHOO.